Nov. 12, 1935.  W. E. METHVIN  2,020,900

STREAM MOTOR

Filed Jan. 18, 1934

Wilbur E. Methvin,
INVENTOR

BY Gardner J. O'Boyle
ATTORNEY

Patented Nov. 12, 1935

2,020,900

UNITED STATES PATENT OFFICE 2,020,900

STREAM MOTOR

Wilbur E. Methvin, Lawrenceburg, Tenn.

Application January 18, 1934, Serial No. 707,186

16 Claims. (Cl. 170—10)

My invention relates to fluid or stream motors and more particularly to an improved rotor adapted to be used with a motor of the fluid type.

Heretofore, it has been proposed to provide fluid motors wherein the blade elements are attached to a central shaft, the blades and shaft being mounted in a suitable frame. The blades are generally propeller shaped and they sometimes have been made in the form of buckets adapted to catch and receive the fluid medium as it passes through the rotor, the medium reacting with the surfaces of the blades to function as an impulse propeller. One of the disadvantages of the prior art devices is that their successful operation depends upon the direction of flow of the fluid medium. In some cases, if the flow of the medium is not perpendicular to the shaft upon which the blades are mounted, the motor will not rotate when the angle of approach of the fluid medium is varied.

One of the main objects of the present invention is to provide a rotor for stream motors wherein the rotor is actuated by the fluid medium regardless of its direction of flow or the angle of approach to the blades of the rotor. This is accomplished by means of a combination of novel blade elements, each blade being of a curvature designed to coact with the fluid medium in a manner to produce rotation, always in the same direction.

The invention in its broadest aspect, comprehends a device which may be driven by any fluid medium and is adapted to be used as a wind or water motor, whereby various types of apparatus may be driven from the power generated by the motor. The fluid medium may consist of a single force or a combination of forces acting upon the rotor in any direction.

An object of my invention is to provide a fluid motor, wherein the rotor member will be actuated by a fluid medium regardless of the direction of flow of the medium.

Another object of my invention is to provide a fluid motor having a rotor adapted to be rotated in a predetermined direction by the fluid medium, without limitation as to the direction or the angle of approach of the fluid medium.

Yet another object of my invention is to provide an improved stream motor adapted to be driven by a moving current of fluid medium, either natural or artificial and at any angle of approach with respect to the rotor elements.

Still another object of my invention is to provide an improved rotor structure for stream motors wherein the blade elements are designed to be acted upon by the fluid medium in the most efficient manner to develop power with the greatest efficiency.

A further object of the invention is to provide a rotor for stream motors, having blade elements of novel curvature, whereby the fluid medium in its passage through the rotor, acts upon the blades without creating any appreciable drag upon the rotor.

With these and other objects in view, which may be incident to my improvements, the invention consists in the parts and combinations to be hereinafter set forth and claimed, with the understanding that the several necessary elements, comprising my invention, may be varied in construction, proportions and arrangement, without departing from the spirit and scope of the appended claims.

In order to make my invention more clearly understood, I have shown in the accompanying drawing means for carrying the same into practical effect, without limiting the improvements in their useful applications to the particular constructions, which for the purpose of explanation, have been made the subject of illustration.

Figure 1:
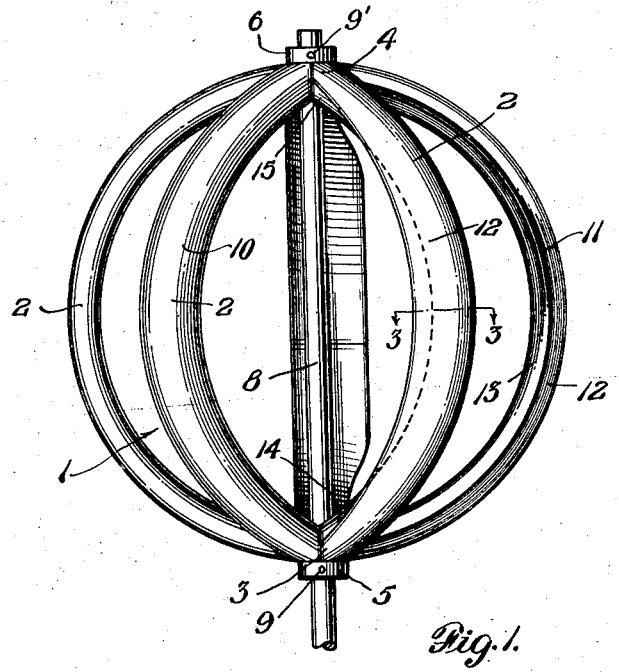
Figure 1 is an elevational view of the rotor element.

Referring to the drawing and more particularly to Figure 1, my improved stream motor comprises a rotor designated generally by numeral 1, having a plurality of blade elements 2, forming hub portions 4 and 5 to which are attached ferrules 6 and 7 by means of which the rotor is keyed to a central shaft 8 by suitable fastening means 9—9'.

Each blade element 2, is semi-circular shaped and is formed with a double camber, providing a blunt leading edge 10 and a thin trailing edge 11. The leading edges of the blades are substantially 180° in curvature between the points of attachment to the hub portions and the top outside surface 12 of the blade is tapered slightly, while the inside surface 13 is formed at a sharp angle between the trailing edge and the point of tangency with the semi-circular leading edge. It will be noted that the trailing edge of each blade slopes inwardly and downwardly at 14 and 15 near the points of attachment to the hub portions.

Figure 2:
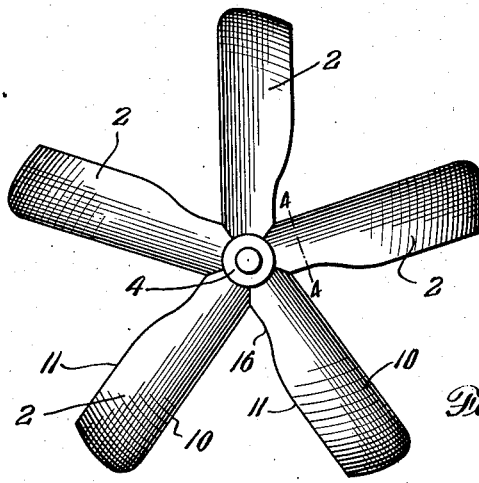
Fig. 2 is a plan view of Figure 1.

Referring to Fig. 2, which is a plan view of the rotor shown in Figure 1, the rotor being adapted for rotation in a counter-clockwise direction it will be seen that the outside portions of the blade are formed with a slight curvature 16, the surfaces 15 and 16 merging to form a trailing edge at a shorter distance from the front of the blade than the trailing edge midway between the ends of the blade.

Figure 3:
Fig. 3 is a sectional view along line 3—3 of Figure 1.
Figure 4:
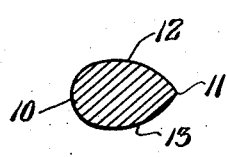
Fig. 4 is a sectional view along line 4—4 of Figure 2.

Referring to Figs. 3 and 4, there is shown cross-sectional views of a blade element, taken along the line between the ends of the blade and near a hub portion thereof. It will be noted that the top outside portion 12 is tapered slightly and that the inside surface 13 is formed at a sharp angle between the trailing edge and the point of tangency with the semi-circular leading edge. The arrangement of the blunt leading edge and tapered portion 13 between the leading edge 10 and the trailing edge 11 is of such construction to cause rotation always in the same direction, that is, counter-clockwise when the rotor is arranged as shown in Figure 2. Near the point of attachment of the blade at the hub portion, distance between the leading edge and trailing edge is less than it is at any point intermediate the ends of the blades.

Figure 5:
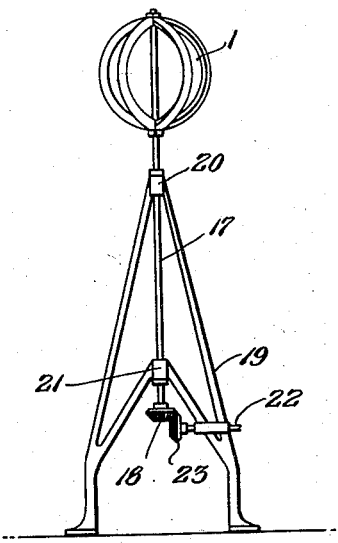
Fig. 5 is a diagrammatic view showing one adaptation of the invention.

Referring to Fig. 5, I have shown one adaptation of the invention used as a wind motor. In this arrangement, the rotor 1, is keyed to a central shaft 17 having a gear 18 attached thereto. The shaft is supported upon a suitable standard 19 formed with bearings 20 and 21 adapted to receive and support the central shaft 17. A driven shaft 22 also mounted on the standard is provided with a gear 23 in mesh with gear 18 by means of which the shaft 22 is driven. The driven shaft may be connected with any apparatus, such as a pump or generator.

In the operation of the device, movement of the air in any direction with respect to the blades, will cause the rotor to be actuated and drive the mechanism connected with the driven shaft 22. It will be appreciated that the rotor may be adapted to freely rotate upon a central shaft, in which case it is provided with a gear adapted to mesh with a gear on the end of the driven shaft.

Due to the novel curvature given to the blade elements and their arrangement in combination to form a sphere shaped rotor, rotation is always in the same direction, even though the fluid medium approaches the blade elements at various angles simultaneously. By means of this arrangement of the blades, a plurality of actuating forces may be combined to impart rotational movement to the sphere, its direction of rotation being independent of the number of forces or their angle of approach.

While I have shown and described the preferred embodiment of my invention, I wish it to be understood that I do not confine myself to the precise details of construction herein set forth, by way of illustrations, as it is apparent that many changes and variations may be made therein, by those skilled in the art, without departing from the spirit of the invention, or exceeding the scope of the appended claims.

What is claimed is:

1. A rotor for stream motors comprising a plurality of double cambered semi-circular shaped blade elements, the camber of the inside of each blade being greater than the camber on the outside of the blade.

2. In a stream motor, a rotor comprising hub portions and a plurality of double cambered semi-circular shaped blade elements attached to said hub portions, the camber of the inside of each blade being greater than the camber on the outside of the blade.

3. In a stream motor, a spherical shaped rotor comprising hub portions and a plurality of double cambered semi-circular shaped blade elements attached to said hub portions, the camber of the inside of each blade being greater than the camber on the outside of the blade.

4. A spherical shaped rotor for stream motors comprising a plurality of double cambered blade elements, the camber of the inside of each blade being greater than the camber on the outside of the blade, the leading edge of each of said blade elements being semi-circular.

5. A rotor for stream motors comprising hub portions, a plurality of double cambered blade elements attached to the hub portions, the camber of the inside of each blade being greater than the camber on the outside of the blade, the leading edge of each of said blades being semi-circular.

6. A rotor for stream motors comprising hub portions, a plurality of double cambered semi-circular shaped blade elements attached to the hub portions, the camber of the inside of each blade being greater than the camber on the outside of the blade, the leading edge of each of said blades being semi-circular.

7. A spherical shaped rotor for stream motors comprising a plurality of double cambered blade elements, the inner surface of each blade being curved inwardly and outwardly near the points to which the rotor is supported.

8. A spherical shaped rotor for stream motors comprising a plurality of double cambered blade elements, the angle of inclination of the outer surface of each blade being less than the inclination of the inner surface of the blade.

9. A rotor for stream motors comprising a plurality of double cambered semi-circular shaped blade elements, the angle of inclination of the outer surface of each blade being less than the inclination of the inner surface of the blade.

10. In a stream motor, a rotor comprising hub portions and a plurality of double cambered semi-circular blade elements attached to the hub portions, the angle of inclination of the outer surface of each blade being less than the inclination of the inner surface of the blade.

11. In a stream motor, comprising hub portions and a plurality of double cambered semi-circular shaped blade elements attached to the hub portions, the inner surface of each blade being curved inwardly and outwardly near the points of attachment of the blades to the hubs.

12. In a stream motor, a rotor comprising hub portions and a plurality of double cambered semi-circular shaped blade elements attached to the hub portions, the angle of inclination of the outer surface of each blade being less than the inclination of the inner surface of the blade, the inner surface of each blade being curved inwardly and outwardly near the points of attachment of the blade to the hubs.

13. A double cambered semi-circular shaped blade element, the camber of the inside of each blade being greater than the camber on the outside of the blade.

14. A double cambered semi-circular shaped blade element having a semi-circular leading edge, the camber on the inside of the blade element being greater than the camber on the outside.

15. A double cambered semi-circular shaped blade element, the width of the blade near the ends thereof being less than the width at the center of the blade.

16. A double cambered semi-circular shaped blade element, having a semi-circular leading edge, the width of the blade near the ends thereof being less than the width at the center of the blade.

WILBUR E. METHVIN.